(12) United States Patent
McMAHON et al.

(10) Patent No.: US 11,866,157 B2
(45) Date of Patent: Jan. 9, 2024

(54) LANDING GEAR SUPPORT (71) Applicant: AIRBUS OPERATIONS LIMITED, Bristol (GB)

(72) Inventors: Andrew McMAHON, Bristol (GB); Saif Rafique, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 158 days.

(21) Appl. No.: 17/433,881

(22) PCT Filed: Jun. 23, 2020

(86) PCT No.: PCT/EP2020/067475
§ 371 (c)(1),
(2) Date: Aug. 25, 2021

(87) PCT Pub. No.: WO2020/260267
PCT Pub. Date: Dec. 30, 2020

(65) Prior Publication Data
US 2022/0048614 A1 Feb. 17, 2022

(30) Foreign Application Priority Data
Jun. 26, 2019 (GB) ....................... 1909166

(51) Int. Cl.
*B64C 25/20* (2006.01)
*B64F 5/10* (2017.01)
*B64C 25/04* (2006.01)

(52) U.S. Cl.
CPC .............. *B64C 25/20* (2013.01); *B64C 25/04* (2013.01); *B64F 5/10* (2017.01)

(58) Field of Classification Search
CPC .......... B64C 25/04; B64C 25/10; B64C 25/20
See application file for complete search history.

(56) References Cited

U.S. PATENT DOCUMENTS

| 1,681,277 A | 8/1928 | Booth | |
| 2,963,246 A * | 12/1960 | Mitrovich | ............... B64C 25/20 244/102 R |
| 6,679,452 B1 * | 1/2004 | Cottet | ..................... B64C 25/04 244/102 R |

FOREIGN PATENT DOCUMENTS

CA 398064 7/1941

OTHER PUBLICATIONS

International Search Report and Written Opinion of the ISA for PCT/EP2020/067475, dated Sep. 28, 2020, 12 pages.

* cited by examiner

Primary Examiner — Philip J Bonzell
Assistant Examiner — Eric Acosta
(74) Attorney, Agent, or Firm — Nixon & Vanderhye P.C.

(57) ABSTRACT

An aircraft landing gear support (1) including: a support member (such as a landing gear rib (2)) and a plurality of pintle supports (5, 7, 8) (typically in the form of lugs) which form a pintle support arrangement for holding a pintle on which a landing gear assembly may be rotatably supported. The lugs are removably attached to the gear rib.

18 Claims, 7 Drawing Sheets

LANDING GEAR SUPPORT

RELATED APPLICATIONS

This application is the U.S. national phase of International Application PCT/EP2020/067475 filed Jun. 23, 2020, which designated the U.S. and claims priority to United Kingdom Patent Application GB 1909166.0 filed Jun. 26, 2019, the entire contents of each of which are hereby incorporated by reference.

BACKGROUND OF THE INVENTION

The present disclosure relates to a landing gear support.

The present invention concerns a landing gear support. The invention also concerns a kit for forming a landing gear support, a wing or an aircraft comprising a landing gear support, a method of making a landing gear support and a method of maintaining an aircraft comprising a landing gear support.

An aircraft main landing gear can be attached to the wing of an aircraft by a gear rib. The gear rib is typically provided with two lugs that support the landing gear pintle on which the landing gear may be supported. The gear rib is typically formed by forging from aluminium or titanium. This has the limitation that the gear rib may only be made from a single material. Furthermore, the shape of the gear rib may be such that it is not possible to use certain materials to make the gear rib.

The present invention seeks to mitigate the above-mentioned problems. Alternatively or additionally, the present invention seeks to provide an improved aircraft landing gear support.

SUMMARY OF THE INVENTION

According to a first aspect of the present invention, there is provided a landing gear support comprising a support member and a plurality of pintle supports which form a pintle support arrangement for holding a pintle on which a landing gear assembly may be rotatably supported, at least one of the pintle supports being removably attached to the support member.

The use of at least one pintle support which is removably attached to the support member enables the pintle support(s) to be made from different materials from the support member. Furthermore, the use of removably attached pintle support(s) in certain circumstances enables the support member to be made from composite materials, depending on the shape of the support member. For the avoidance of doubt, "removably attached" indicates that the respective pintle support may be removed from the support member without causing damage to the support member or the pintle support. For the avoidance of doubt, those skilled in the art will realise that the pintle and the landing gear assembly are not part of the landing gear support of the present invention.

Optionally, more than one and optionally each of the pintle supports may be removably attached to the support member. At least one of the pintle supports may be one or both of chemically and/or mechanically fastened to the support member. The landing gear support therefore optionally comprises one or more fasteners for attaching the at least one pintle support to the support member. The one or more fasteners are optionally releasable to facilitate removable attachment of the at least one pintle support to the support member. Optionally, at least one, optionally more than one and optional each of the pintle supports may be mechanically fastened to the support member. A mount may be provided to facilitate removable attachment of one or more pintle supports to the support member. A mount may be provided to facilitate attachment of more than one pintle support to the support member. For example, a mount may be provided to facilitate attachment of two pintle supports to the support member. This may be of use, for example, if two pintle supports are located close to one another. At least one, optionally more than one and optionally each mount may comprise a flange for facilitating attachment of the pintle support to the support member. At least one, optionally more than one and optionally each mount may comprise a male or female configuration for mating with a corresponding female or more configuration provided on the support member. At least one, optionally more than one and optionally each mount may comprise a male configuration (such as a spigot) for mating with a corresponding female configuration provided on the support member.

Optionally, the pintle support arrangement comprises a first pintle support which is removably attached to the support member and a second pintle support which is removably attached to the support member, the second pintle support being separately removably attached to the support member from the first pintle support. Such an arrangement facilitates independent removal of pintle supports. The pintle support arrangement may comprise a third pintle support which is removably attached to the support member. The third pintle support may be separately removably attached to the support member from the first pintle support. The third pintle support may be associated with the second pintle support so that the second and third pintle supports are removable together.

The pintle support arrangement may comprise a support portion comprising a pintle support and a mount for facilitating mounting of the respective pintle support to the support member, the support portion being removably attached to the support member. The support portion may comprise a male or female configuration for mating with a corresponding female or more configuration provided on the support member. The support portion may be of unitary construction, and may be formed, for example, by machining from a billet or forging. The mount may comprise one or more flanges for facilitating removable attachment to the support member. The support portion is optionally mechanically attached to the support member. The landing gear support therefore optionally comprises one or more fasteners for attaching the support portion to the support member. The one or more fasteners are optionally releasable to facilitate removable attachment of the support portion to the support member.

Optionally, the pintle support arrangement may comprise a first support portion comprising a first pintle support and a first mount for facilitating mounting of the first pintle support to the support member, and a second support portion comprising a second pintle support and a second mount for facilitating mounting of the second pintle support to the support member, the first and second support portions being separately removably attached to the support member. The second support portion may comprise a third pintle support. The first and/or the second mount may comprise one or more flanges for facilitating attachment to the support member. The first and second support portion are optionally mechanically attached to the support member. The landing gear support therefore optionally comprises one or more fasteners for attaching the first and second support portions to the support member. The one or more fasteners are optionally releasable to facilitate removable attachment of the respective support portion to the support member.

Optionally at least one, optionally more than one and optionally each pintle support may comprise (i) a spacer portion for holding a pintle in a spaced relationship from the support member and (ii) a pintle-receiving portion. The pintle-receiving portion optionally defines an aperture for the receipt of a pintle. Optionally at least one, optionally more than one and optionally each pintle support may comprise a lug.

At least one, optionally more than one and optionally each of the pintle supports may be formed from a different material than the support member.

The support member may be forged. The support member may be formed from one or both of aluminium and titanium.

The support member may alternatively be formed from a composite material. A composite material optionally comprises a reinforcing component distributed in a matrix. The reinforcing component may comprise fibre and/or particulate. The matrix may comprise a polymeric material, for instance.

The support member may comprise one or more flanges for facilitating attachment to one or more aircraft surfaces. The support member may comprise one or more flanges for facilitating attachment to a wing skin. The support member may comprise one or more flanges for facilitating attachment to an upper wing skin and one or more flanges for facilitating attachment to a lower wing skin. The support member may comprise one or more flanges for facilitating attachment to a wing spar.

At least one, optionally more than one and optionally each pintle support may be metallic, optionally being formed from one or both of aluminium and titanium. At least one, optionally more than one and optionally each pintle support may be forged.

The support member may be a gear rib, for example.

According to a second aspect of the present invention, there is provided a pintle support for use in the landing gear support of the first aspect of the present invention. The pintle support may comprise those features described above in relation to the landing gear support of the first aspect of the present invention.

According to a third aspect of the present invention, there is provided a support member for use on the landing gear support of the first aspect of the present invention. The support member may comprise those features described above in relation to the landing gear support of the first aspect of the present invention.

According to a fourth aspect of the invention there is provided a kit for forming a landing gear support in accordance with the first aspect of the present invention, the kit comprising a support member and one or more pintle supports for holding a pintle on which a landing gear assembly may be rotatably supported. The pintle support may be a pintle support in accordance with the second aspect of the present invention. The support member may be a support member in accordance with the third aspect of the present invention.

The kit may comprise one or more mounts for facilitating removable attachment of one or more pintle supports to the support member. The support member, the one or more pintle supports and one or more mounts (if present) may comprise the features described above in relation to the landing gear support of the first aspect of the present invention. For example, the kit may comprise a plurality of pintle supports removably mountable on the support member to form a pintle support arrangement for holding a pintle on which a landing gear assembly may be rotatably mounted. The kit may comprise a first support portion comprising a first pintle support and a first mount for facilitating mounting of the first pintle support to the support member, and a second support portion comprising a second pintle support and a second mount for facilitating mounting of the second pintle support to the support member, the first and second support portions being separately removably attachable to the support member.

According to a fifth aspect of the invention there is provided an aircraft wing comprising a landing gear support in accordance with the first aspect of the present invention. For the avoidance of doubt, the aircraft wing is typically a main wing of an aircraft.

The landing gear support may optionally be attached to one or more of an upper wing skin, a lower wing skin and a spar.

According to a sixth aspect of the invention there is provided an aircraft comprising a landing gear support in accordance with the first aspect of the present invention.

The landing gear support may be located in a fuselage or a wing of the aircraft.

According to a seventh aspect of the present invention there is provided a method of making a landing gear support in accordance with the first aspect of the present invention, the method comprising attaching one or more pintle supports to a support member, thereby providing a pintle support arrangement for holding a pintle on which a landing gear assembly may be rotatably supported.

The support member may, for example, be a gear rib.

The method optionally comprises attaching a plurality of pintle supports to the support member, thereby providing the pintle support arrangement.

One or more pintle supports may be associated with a mount for facilitating removable attachment of said one or more pintle support. The method may therefore comprise attaching said mount to the support member.

The method may comprise attaching a first pintle support to the support member in a first position and attaching a second pintle support to the support member in a second position.

The pintle support(s), the support member and mount(s), if present, may comprise those features described above in relation to the landing gear support of the first aspect of the present invention. For example, the method may comprise attaching a support portion to the support member, the support portion comprising a pintle support and a mount for facilitating removable attachment of the support portion to the support member. The method may comprise attaching a first support portion to the support member, the first support portion comprising a first pintle support and a first mount for facilitating removable attachment of first support portion to the support member, and attaching a second support portion to the support member, the second support portion comprising a second pintle support and a second mount for facilitating removable attachment of the second support portion to the support member.

The first and second support portions may comprise those features described above in relation to the landing gear support of the first aspect of the present invention.

According to a eighth aspect of the present invention there is provided a method of maintaining an aircraft comprising a landing gear support, the landing gear support comprising a support member and a pintle support arrangement for holding a pintle on which a landing gear assembly may be rotatably supported, the pintle support arrangement comprising a plurality of pintle supports, the method comprising removing one or more of the pintle supports from the support member.

Removal of a pintle support may comprise releasing a mechanical fastening.

The landing gear support may be a landing gear support in accordance with the first aspect of the present invention.

For the avoidance of doubt, the support member is in situ in the aircraft when the one or more pintle support is removed i.e. the support member itself is not removed from the aircraft. Furthermore, the removal of one or more of the pintle supports from the support member damages neither the pintle support nor the support member. Removing one or more of the pintle supports from the support member may comprise removing a support portion comprising a pintle support and a mount for facilitating mounting of the respective pintle support to the support member.

The method may comprise removing more than one and optionally all of the pintle supports which make-up the pintle support arrangement.

The method may comprise removing the landing gear assembly and subsequently removing one or more of the pintle supports from the support member.

The method may comprise replacing the removed one or more pintle supports with a corresponding one or more pintle supports. The method may comprise reattaching the landing gear to the pintle support arrangement.

The method may comprise raising the aircraft, optionally prior to removal of the landing gear, if the landing gear assembly is removed.

The method may comprise lowering the aircraft, optionally after the landing gear assembly is reattached to the pintle support arrangement.

The landing gear support may be a landing gear support in accordance with the first aspect of the present invention.

For the avoidance of doubt, the landing gear support is optionally for main landing gear, as opposed to a nose landing gear.

According to a ninth aspect of the present invention, there is provided a landing gear support comprising a landing gear rib and a plurality of lugs configured for supporting a pintle on which a landing gear assembly may be rotatably supported, at least one of the lugs being removably attached to the support member.

Those skilled in the art will realise that the pintle and landing gear arrangement are not part of the landing gear support of the ninth aspect of the present invention.

It will, of course, be appreciated that features described in relation to one aspect of the present invention may be incorporated into other aspects of the present invention. For example, the methods of the seventh and eighth aspects of the present invention may incorporate any of the features described above with reference to the landing gear support of the first aspect of the present invention and vice versa.

DESCRIPTION OF THE DRAWINGS

Embodiments of the present invention will now be described by way of example only with reference to the accompanying schematic drawings of which.

DETAILED DESCRIPTION

Figure 1:
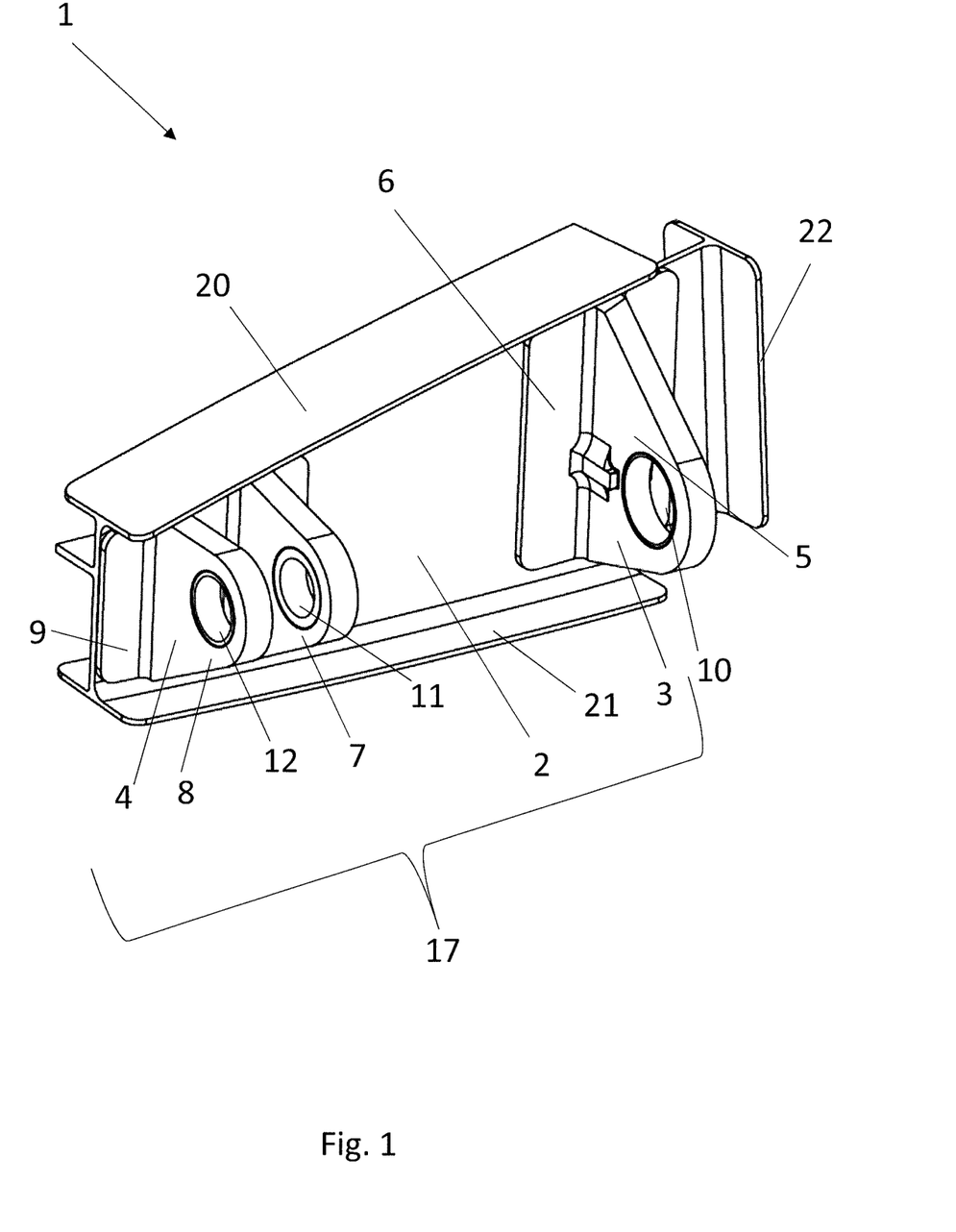
FIG. 1 shows a perspective view of an example of an embodiment of a landing gear support in accordance with the present invention.
Figure 2:
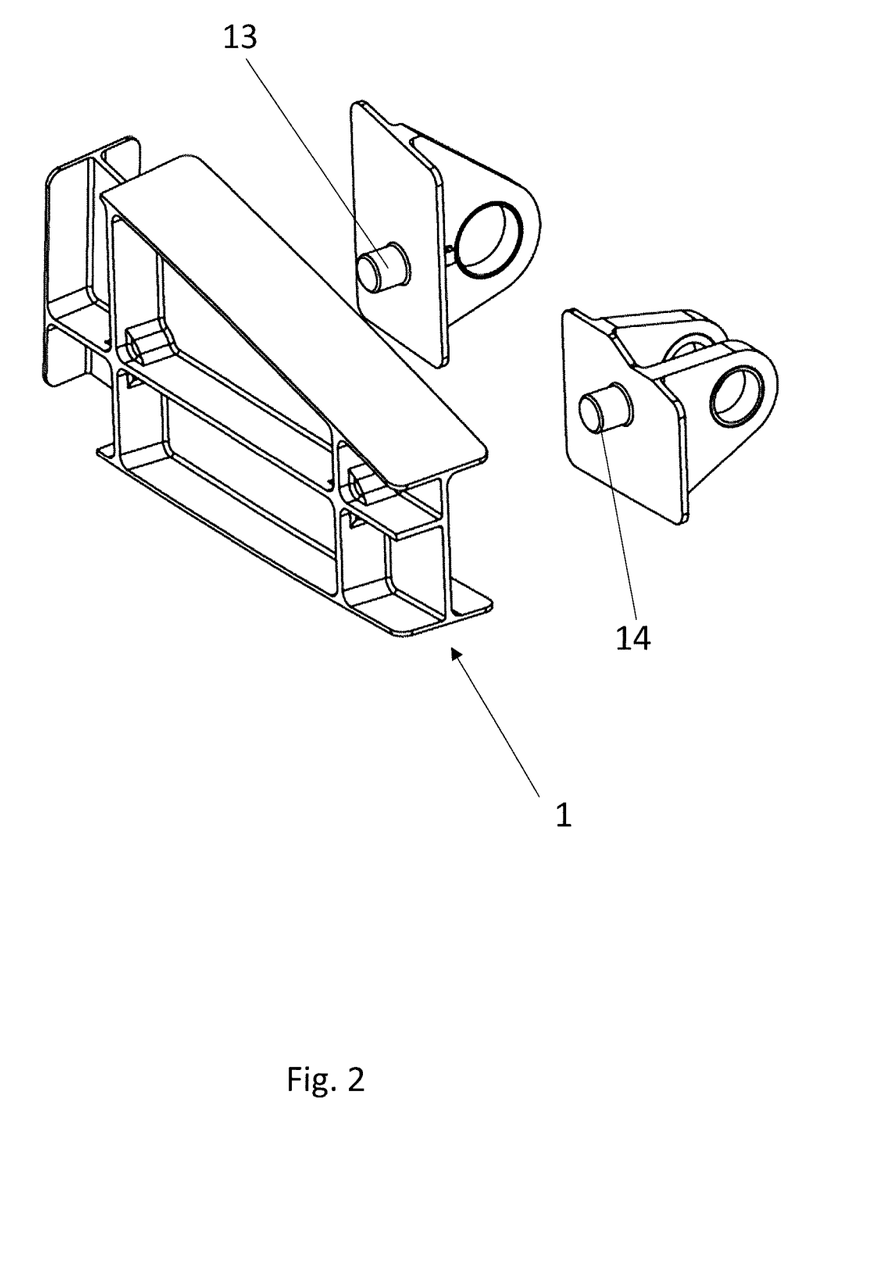
FIG. 2 shows an exploded perspective view of the landing gear support of FIG. 1.
Figure 3:
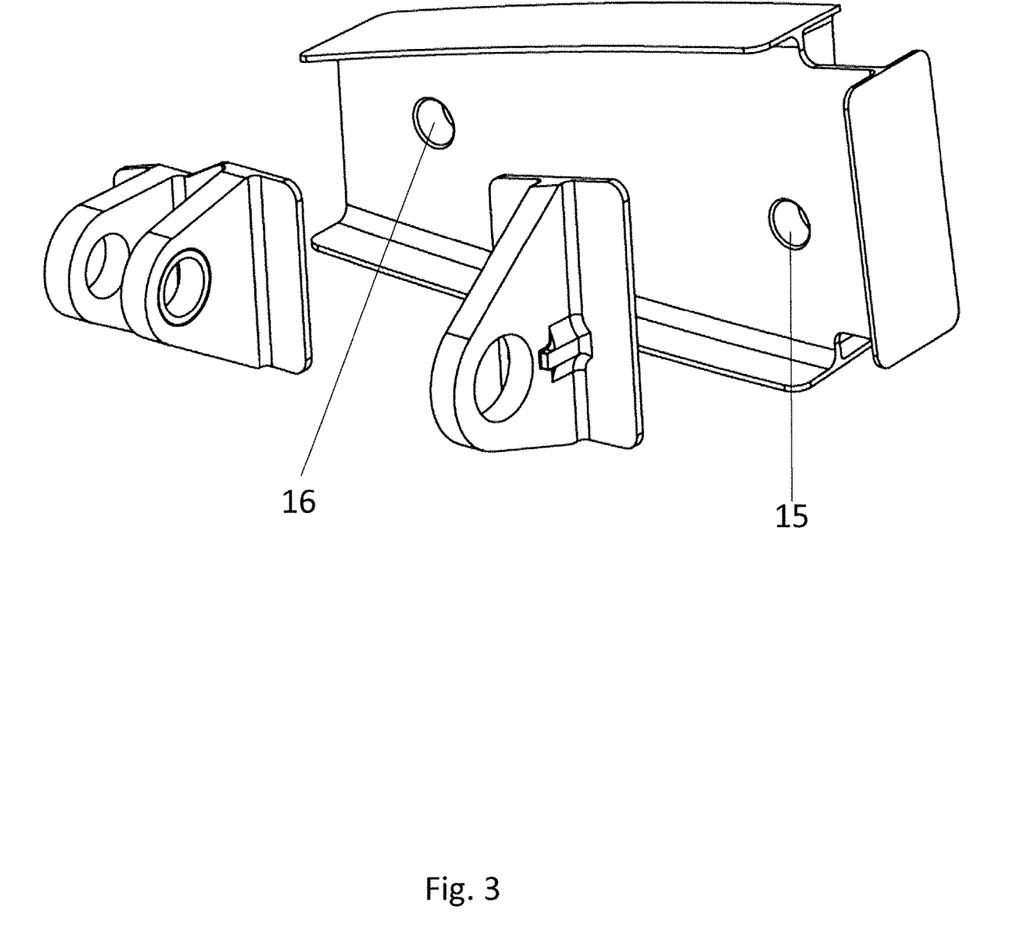
FIG. 3 shows an alternative exploded perspective view of the landing gear support of FIG. 1.

An example of an embodiment of a landing gear support will now be described by way of example only with reference to FIGS. 1 to 3. The landing gear support is denoted generally by reference numeral 1 and comprises a support member in the form of a gear rib 2 and a pintle support arrangement shown generally by reference numeral 17. The pintle support arrangement 17 holds a pintle (not shown) on which a landing gear assembly may be rotatably supported. The pintle support arrangement 17 comprises a first support portion 3 and a second support portion 4. The first 3 and second 4 support portions are removably attached to the gear rib 2 by bolts (not shown). This facilitates simple removal and replacement of the first 3 and second 4 support portions, and allows the first 3 and second 4 support portions to be made from different materials than the gear rib 2. The first support portion 3 comprises a first pintle support 5 attached to first mounting flange 6. The first pintle support 5 is provided with a first pintle support aperture 10 for the receipt of a pintle (not shown). A first spigot 13 projects from the first mounting flange 6 in a direction opposite from that to which the first pintle support 5 projects. The second support portion 4 comprises second pintle support 7 and third pintle support 8 which project from second mounting flange 9. The attachment bolts (not shown) extend through apertures (not shown) provided in the gear rib 2 and the mounting flanges 6, 9. Each of the second 7 and third 8 pintle supports is provided with a respective second pintle support aperture 11 and a third pintle support aperture 12 for the receipt of the pintle (not shown). The second support portion 4 comprises a second spigot 14 which projects in a direction opposite from that to which the second 7 and third 8 pintle supports project. Each spigot 13, 14 is seated in a corresponding recess 15, 16 provided in the gear rib 2.

The gear rib 2 is forged from aluminium. The first 3 and second 4 support portions are forged from aluminium.

Figure 4:
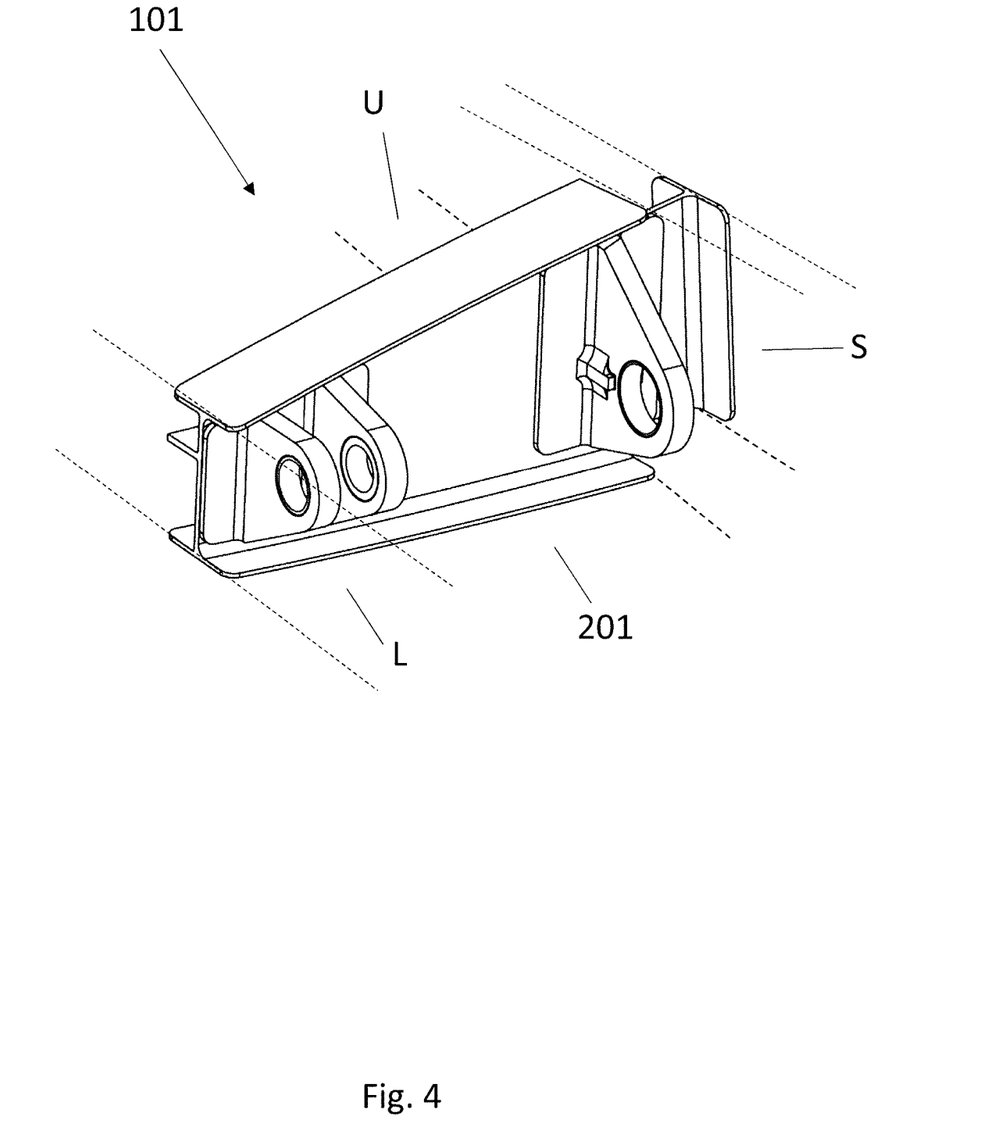
FIG. 4 shows a schematic view of an example of an embodiment of an aircraft wing in accordance with the present invention.

FIG. 4 shows an example of an embodiment of an aircraft wing in accordance with the present invention, the aircraft wing being denoted generally by reference numeral 201. The landing gear support is denoted generally by reference numeral 101 and is essentially the same as landing gear support 1 as described above. Referring to FIGS. 1 and 4, gear rib 2 of landing gear support 101 comprises an upper flange 20 for supporting upper wing skin U, a lower flange 21 for supporting lower wing skin L and a forward flange 22 for attachment of the gear rib 2 to wing spar S.

Figure 5:
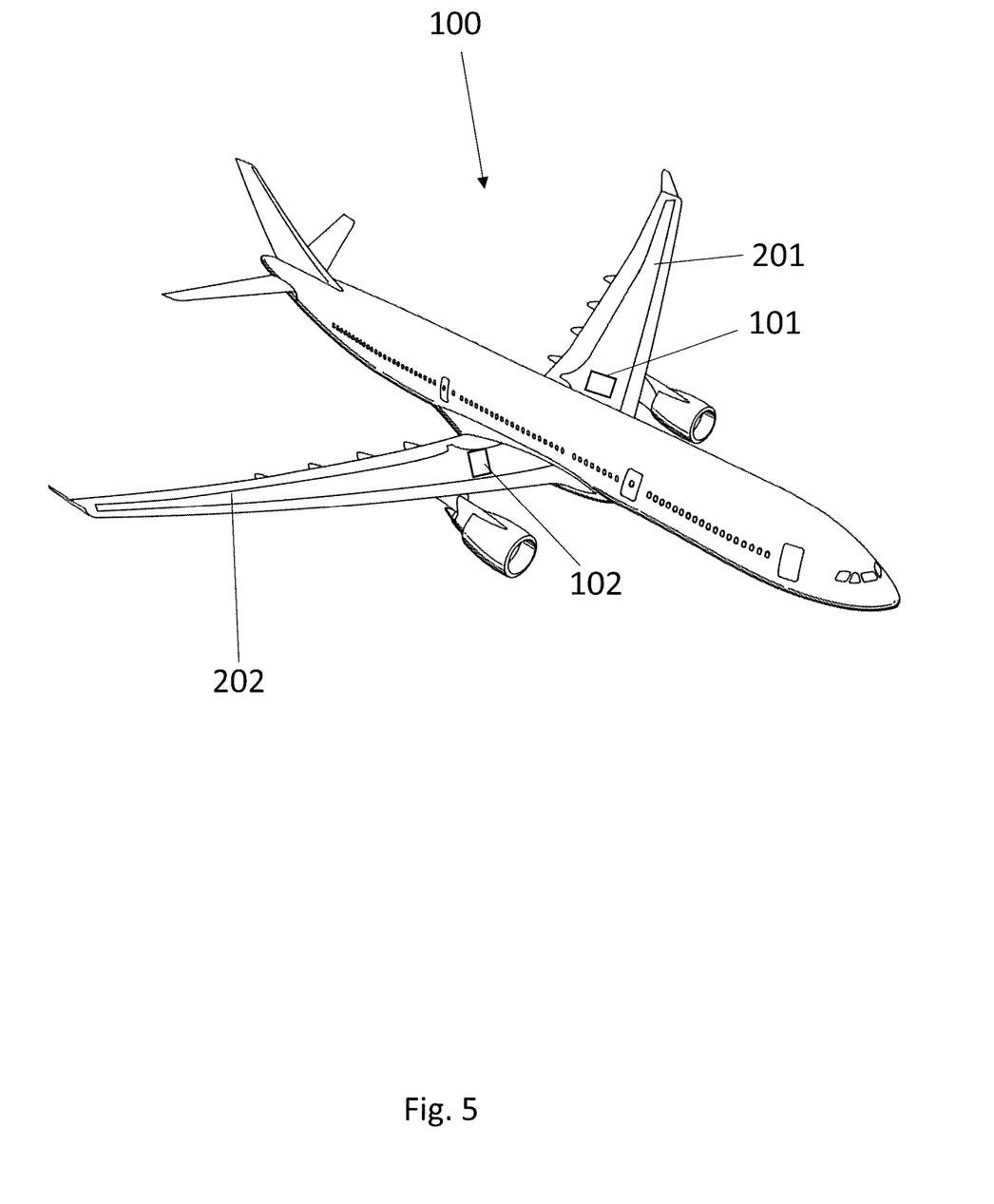
FIG. 5 shows a schematic representation of an example of an embodiment of an aircraft in accordance with the present invention.

FIG. 5 shows an example of an embodiment of an aircraft in accordance with the present invention, the aircraft being denoted generally by reference numeral 100. The aircraft 100 comprises a first landing gear support 101 located in a first wing 201 and a second landing gear support 102 located in a second wing 202. The first landing gear support 101 and the second landing gear support 102 are essentially the same as that described above in relation to FIGS. 1 to 3, although they will be necessarily be minor images of one another to conform to the mirror-image geometries of the respective wing in which the landing gear support is located.

Figure 6:
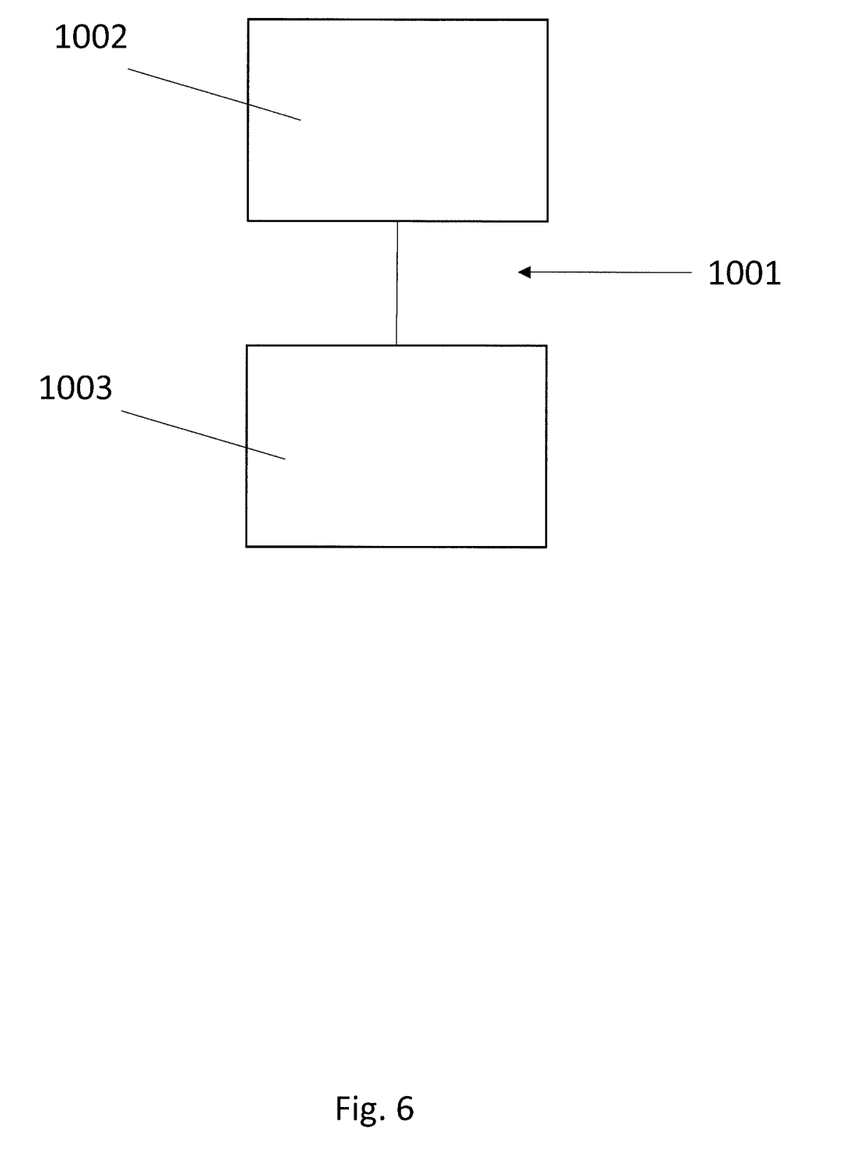
FIG. 6 shows a schematic representation of an example of an embodiment of a method of making a landing gear support in accordance with the present invention.

FIG. 6 is a schematic representation of an example of an embodiment of a method of forming a landing gear support in accordance with the present invention. The method is denoted generally by reference numeral 1001. The method 1001 comprises attaching 1002 a first support portion to the gear rib, the first support portion comprising a first pintle support attached to a first mounting plate and attaching 1003 a second support portion to the gear rib, the second support portion comprising a second pintle support and a third pintle support attached to a second mounting plate. The first and second support portions are as described above in relation to FIGS. 1 to 3. As mentioned above, such an arrangement facilitates removal and replacement of the first and second support portions and allows the first and second support portions to be made from a different material from the gear rib.

Figure 7:
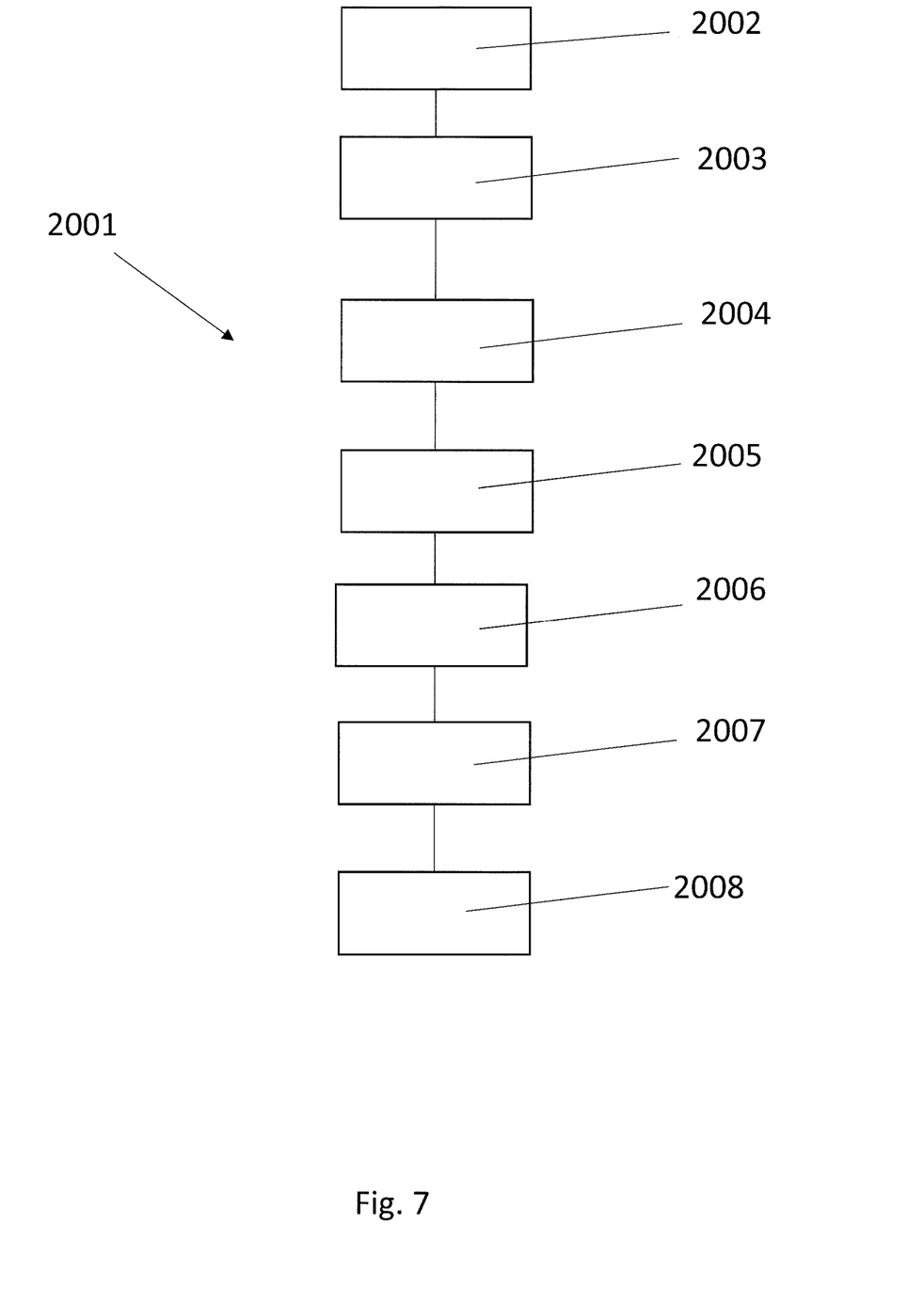
FIG. 7 shows a schematic representation of an example of an embodiment of a method of maintaining an aircraft comprising a landing gear support in accordance with the present invention

FIG. 7 is a schematic representation of an example of an embodiment of a method of maintaining an aircraft comprising a landing gear support in accordance with the present invention. The method is denoted generally by reference number 2001. The method 2001 comprises raising 2002 the aircraft so that the landing gear is raised from the ground, detaching 2003 and removing 2004 the landing gear from the landing gear support, removing 2005 the first support portion, attaching 2006 a replacement first support portion, reattaching 2007 the landing gear and lowering 2008 the aircraft. The first and second support portions are as described above in relation to FIGS. 1 to 3. Removing 2005 the first support portion comprises releasing one or more bolts used to attach the first support portion to the support member. Similarly, attaching 2006 a replacement first support portion comprises fastening one or more bolts to attach the replacement first portion to the support member.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The support member and the support portions may be forged from a material other than aluminium, for example, titanium. The support member may alternatively be formed from a composite material, for example, carbon fibres dispersed in a polymeric matrix. The support portions may alternatively be machined from a billet.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A landing gear support comprising:
a gear rib including an upper flange supporting an upper wing skin, a lower flange supporting a lower wing skin, a forward flange attached to a wing spar,
mounts each having a first surface abutting and fastened to the web of the gear rib and a second surface opposite to the first surface, and
pintle supports integral with a respective one of the mounts such that the pintle support and the mount is a single piece component, wherein each of the pintle supports extends outward from the first surface of the mount and each of the pintle supports includes an aperture configured to receive a pintle to rotatably support a landing gear assembly attached to the pintle,
wherein at least one of the mounts is removably attached to the support member separately from another of the mounts.

2. The landing gear support according to claim 1, wherein each of the mounts is removably attached to the web of the gear rib.

3. The landing gear support according to claim 1, wherein at least one of the mounts is mechanically fastened to the web of the gear rib.

4. The landing gear support according to claim 1, a first mount of the mounts is removably attached to the web of the gear rib, and
a second mount of the mounts is removably attached to the web of the gear rib,
wherein the second mount is separately removably attached to the web of the gear rib from the first mount, and
wherein the first mount has only one of the pintle supports and the second mount has at least two of the pintle supports.

5. The landing gear support according to claim 4, wherein the pintle support arrangement comprises:
a third mount of the mounts is removably attached to the web of the gear rib,
wherein the third mount is a single piece component with only one of the pintle supports,
Wherein the third mount is separately removably attached to the web of the gear rib from the first mount and the second mount.

6. The landing gear support according to claim 1, wherein a male protrusion or a female recess is on the second surface of each of the mounts, and the male protrusion or female recess is configuration to mate with a corresponding female recess or male protrusion on the web of the gear rib.

7. The landing gear support according to claim 1, wherein each of the mounts includes one or more flanges integral with the respective mount and extending away from the web of the gear rib, and the flanges are configured to facilitate removable attachment of the mount with the flanges to the web of the gear rib.

8. The landing gear support according to claim 1, further comprising:
a spacer portion configured to hold the first or second mount in a spaced relationship from the web of the gear rib.

9. The landing gear support according to claim 1, wherein the at least one of the first and second pintle supports is formed from a material different from a material forming the mount to which the first or second pintle support is integral with.

10. A kit for forming the landing gear support in accordance with claim 1, the kit comprising the first and second support portions.

11. An aircraft wing comprising a landing gear support in accordance with claim 1.

12. An aircraft comprising a landing gear support in accordance with claim 1.

13. A method of making a landing gear support in accordance with claim 1, the method comprising attaching one or more pintle supports to a support member, thereby providing a pintle support arrangement for holding a pintle on which a landing gear assembly may be rotatably supported.

14. The A landing gear support comprising:
a gear rib including an upper flange configured to support an upper wing skin, a lower flange configured to support a lower wing skin, a forward flange configured to attached to a wing spar,
a first support portion including:
a first mount having a first surface abutting the web of the gear rib and a second surface opposite to the first surface, and
first pintle supports integral with and forming a single piece component with the first mount, the first pintle supports extend outward from the first surface of the first mount, and the first pintle supports each include a first aperture configured to receive a first pintle to rotatably support a landing gear assembly attached to the first pintle,
a second support portion including:
a second mount having a first surface abutting the web of the gear rib and a second surface opposite to the first surface, and
a second pintle support integral with and forming a single piece component with the second mount, the second pintle support extends outward from the first surface of the second mount, and the second pintle support includes a second aperture configured to receive a second pintle to rotatably support the landing gear assembly attached to the second pintle,
wherein the first mount and the first pintle support are removably attached to the web of the gear rib separately from the second mount and the second pintle support.

15. The landing gear support according to claim 14, wherein the first mount is integral with and a single piece component with at least three of the first pintle supports, and
wherein the second pintle support is the one and only pintle support integral or attached to the second mount.

16. The landing gear support according to claim 14, wherein the first mount and/or the second mount comprise one or more flanges integral with the first or second mount and configured to facilitate attachment of the first or second mount to the web of the gear rib.

17. The landing gear support according to claim 14, further comprising one or more fasteners for attaching the first and second support mounts to the web of the gear rib.

18. A method of maintaining an aircraft comprising:
a wing including an upper skin, a lower skin and a front spar and a gear rib, wherein the gear rib includes an upper flange supporting the upper skin, a lower flange supporting the lower skin and a forward flange attached to the front spar,
mounts each having a first surface facing and attached to the web of the gear rib and a second surface opposite to the first surface, and
pintle supports each integral and forming a single piece component with a respective one of the mounts and extending outward from the first surface of the respective one of the mounts and each of the pintle supports includes an aperture configured to receive a pintle to rotatably support a landing gear assembly attached to the pintle,
the method comprising removing one or more of the pintle supports from the gear rib, wherein the removal includes removing at least one of the pintle supports from the web of the gear rib separately from other of the pintle supports.

* * * * *